(12) United States Patent
Johnson et al.

(10) Patent No.: US 7,843,886 B2
(45) Date of Patent: Nov. 30, 2010

(54) METHODS, MOBILE STATIONS, AND SYSTEMS FOR DETERMINING BASE STATION IDENTIFIER CODES FOR HANDOVER CANDIDATES IN A NETWORK

(75) Inventors: Phillip Marc Johnson, Raleigh, NC (US); William O. Camp, Jr., Chapel Hill, NC (US)

(73) Assignee: Sony Ericsson Communications AB, Lund (SE)

( * ) Notice: Subject to any disclaimer, the term of this patent is extended or adjusted under 35 U.S.C. 154(b) by 542 days.

(21) Appl. No.: 11/606,756

(22) Filed: Nov. 30, 2006

(65) Prior Publication Data

US 2008/0130586 A1 Jun. 5, 2008

(51) Int. Cl.
*H04W 4/00* (2009.01)

(52) U.S. Cl. .............. 370/332; 370/331; 370/333; 455/115.3; 455/436

(58) Field of Classification Search ......... 370/331–333; 455/436, 115.3
See application file for complete search history.

(56) References Cited

U.S. PATENT DOCUMENTS

2003/0087647 A1   5/2003   Hurst

| | | |
|---|---|---|
| 2004/0235471 A1 | 11/2004 | Madsen |
| 2005/0032542 A1* | 2/2005 | Wilborn et al. .......... 455/525 |
| 2006/0067247 A1* | 3/2006 | Rajan ..................... 370/254 |
| 2006/0160490 A1* | 7/2006 | Melero ................ 455/67.11 |

FOREIGN PATENT DOCUMENTS

| | | |
|---|---|---|
| EP | 0895435 A | 2/1999 |
| WO | WO 2004/025983 A | 3/2004 |

OTHER PUBLICATIONS

International Search Report and Written Opinion for PCT/US2007/014411; date of mailing Jan. 30, 2008.
"Digital Cellular Telecommunications System (Phase 2+); Radio Subsystem Link Control (3GPP TS 05.08 Version 8.23.0 Release 1999); ETSI TS 100 911"; ETSI Standards, European Telecommunications Standards Institute, Sophia-Antipo, FR, vol. 3-G, 3-G1; SMG2, No. V8230; Nov. 2005, pp. 1-102.
"Network pre-requisites" *Release 5 3GPP TS 45.008 V5.22.0* pp. 27-42 (2006).

* cited by examiner

*Primary Examiner*—Kamran Afshar
*Assistant Examiner*—Munsoon Choo
(74) *Attorney, Agent, or Firm*—Myers Bigel Sibley & Sajovec, P.A.

(57) ABSTRACT

A method of providing a toplist of neighboring base stations for a mobile station in a communications network can include determining a base station identifier code for a neighboring base station in a toplist at a rate that varies based on a quality indication of communications with the neighboring base station.

17 Claims, 6 Drawing Sheets

| BCCH | BSIC | RXLEV | Rate |
|---|---|---|---|
| 8 | 140 | -80 | 1 |
| 11 | 145 | -90 | 2 |
| 1 | 150 | -100 | 3 |
| 7 | 140 | -100 | 8 |
| 2 | 125 | -100 | 10 |
| 5 | 135 | -95 | 3 |

FIGURE 5A

| BCCH | BSIC | RXLEV | Rate |
|---|---|---|---|
| 8 | 140 | -95 | 3 |
| 11 | 145 | -85 | 1 |
| 1 | 150 | -85 | 2 |
| 7 | 155 | -98 | 8 |
| 2 | 125 | -100 | 10 |
| 5 | 135 | -95 | 3 |

FIGURE 5B

| BCCH | BSIC | RXLEV | Rate |
|---|---|---|---|
| 8 | 140 | -102 | 16 |
| 11 | 145 | -80 | 1 |
| 1 | 150 | -95 | 3 |
| 7 | 155 | -95 | 3 |
| 2 | 150 | -90 | 2 |
| 5 | 135 | -100 | 10 |

FIGURE 5C

| BCCH | BSIC | RXLEV | Rate |
|---|---|---|---|
| 8 | 155 | -90 | 2 |
| 11 | 145 | -80 | 1 |
| 1 | 150 | -95 | 3 |
| 7 | 155 | -90 | 2 |
| 2 | 150 | -95 | 3 |
| 5 | 135 | -100 | 10 |

FIGURE 5D

| BCCH | BSIC | RXLEV | Rate | BER |
|------|------|-------|------|-----|
| 8    | 140  | -80   | 2    | 2   |
| 11   | 145  | -90   | 1    | 1   |
| 1    | 150  | -100  | 3    | 2   |
| 7    | 140  | -100  | 8    | 2   |
| 2    | 125  | -100  | 10   | 2   |
| 5    | 135  | -95   | 3    | 2   |

FIGURE 6B

| BCCH | BSIC | RXLEV | Rate | BER |
|------|------|-------|------|-----|
| 8    | 140  | -80   | 1    | 2   |
| 11   | 145  | -90   | 2    | 2   |
| 1    | 150  | -100  | 3    | 2   |
| 7    | 140  | -100  | 8    | 2   |
| 2    | 125  | -100  | 10   | 2   |
| 5    | 135  | -95   | 3    | 2   |

FIGURE 6A

METHODS, MOBILE STATIONS, AND SYSTEMS FOR DETERMINING BASE STATION IDENTIFIER CODES FOR HANDOVER CANDIDATES IN A NETWORK

FIELD OF THE INVENTION

The present invention relates to the field of communications in general and, more particularly, to wireless communications.

BACKGROUND

It is known to partition wireless communication networks into cells so that different base stations can provide service to different cells each of which covers a different geographic area. To reduce interference between base stations that serve adjacent geographic areas, base stations can be assigned broadcast control channel frequencies according to a re-use pattern so as to minimize the likelihood that two base stations covering adjacent geographic areas use the same control channel frequency to service mobile stations.

For example, it is known to provide a group of twelve base station transceivers covering a contiguous geographic area with twelve different control channel frequencies. This pattern of control channel frequencies can be repeated for a second group of base stations even though the second group of base stations is located adjacent to the first group. This type of frequency re-use patterning can reduce the likelihood of interference between base stations that use the same control channel frequencies.

One of the activities that commonly arises in a wireless communications system such as the ones described above, is that of handover. In particular, when a mobile station is located within a geographic area serviced by a base station, that base station may currently provide service to the mobile station. As the mobile station moves within the area covered by the network, another base station may provide better service to the mobile station due to the new location of the mobile station. Accordingly, it is known to handover service of the mobile station from a currently serving base station to a neighboring base station, which may provide better service.

One of the ways in which mobile stations assist in the evaluation for a handover is to periodically send measurement reports of nearby base stations to the network. In the process of doing these measurements, the mobile station maintains what is commonly referred to as a toplist. The toplist maintained by the mobile station records a number of neighboring base stations, which may be likely candidates for handover given a mobile station's current location. The measurements reported to the network contain the basestation identity code (BSIC) for each basestation in the toplist. Also, the base station identity code is verified periodically by the mobile station for the reported base stations in the toplist.

It is an issue in many dense network environments, that these measurement reports, which must include the BSIC for each measurement in some networks, be made rapidly enough so that a handover may be completed before the mobile moves out of range of the serving base station. It is a further issue that the BSIC can be determined by demodulating/decoding the received signal only at certain times.

SUMMARY

Embodiments according to the invention can provide methods, mobile stations, and systems for determining base station identifier codes for handover candidates in a network. Pursuant to these embodiments, a method of providing a toplist of neighboring base stations for a mobile station in a Global System for Mobile (GSM) communications network can include scheduling the decoding of a base station identifier code for a neighboring base station in a toplist at a rate that varies based on a quality indication of communications with the neighboring base station.

In some embodiments according to the invention, a method of providing a toplist of neighboring base stations for a mobile station in a communications network includes measuring broadcast control channels (BCCHs) utilized by neighboring base stations to provide a plurality of respective RXLEVs for inclusion in a toplist. A first signal carried on a first synchronization channel included in a first BCCH having a first RXLEV is decoded at a first rate to provide a first base station identifier code. A second signal carried on a second synchronization channel included in a second BCCH having a second RXLEV that is less than the first RXLEV is decoded at a second rate that is less than the first rate to provide a second base station identifier code. The toplist including the first and second base station identifier codes and the first and second RXLEVs are provided to the network.

In some embodiments according to the invention, a method of handling handovers for a mobile station in a Global System for Mobile (GSM) communications network includes determining a specification of a quality indication, based on loading of the network, maintenance of the network, and/or geographic features proximate to a base station currently serving the mobile station, to be used by the mobile station to determine base station identifiers codes for inclusion in a toplist at variable rates based on the quality indication.

BRIEF DESCRIPTION OF THE DRAWINGS

FIGS. 5A-5D are schematic representations of toplists during operations of a mobile station moving within the wireless communications network shown in FIG. 4 in some embodiments according to the invention.

FIGS. 6A-6B are schematic representations of toplists that illustrate operations of a mobile station moving within the wireless communications network shown in FIG. 4 in some embodiments according to the invention.

DESCRIPTION OF EMBODIMENTS ACCORDING TO THE INVENTION

Figure 1:
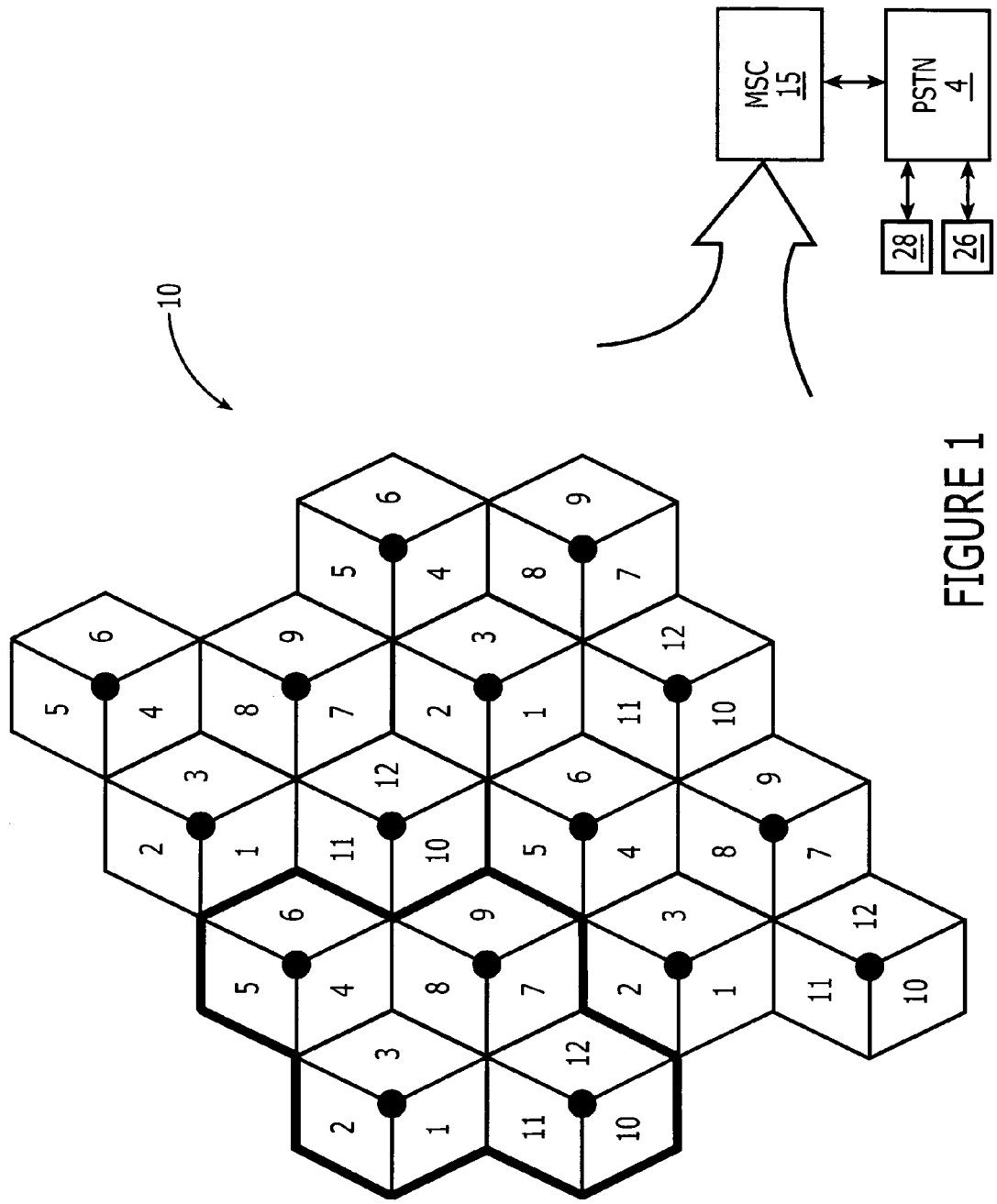
FIG. 1 is a schematic illustration of a wireless communications network organized according to a 4/12 frequency re-use pattern in some embodiments according to the invention.

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be emphasized that the term "comprises/comprising" when used in this specification is taken to specify the presence of stated features, integers, steps or components but does not preclude the presence or addition of one or more other features, integers, steps, components or groups thereof.

It will be understood that although the terms first and second may be used herein to describe various components these components should not be limited by these terms. These terms are only used to distinguish one component from another. Thus, for example, a first component discussed below could be termed a second component without departing from the teachings of the present invention.

The invention is described with reference to flowcharts and block diagrams of mobile stations, communications networks, and operations thereof according to embodiments of the invention. It will be understood that each block of the flowcharts and/or block diagrams, and combinations of blocks, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or schematic block or blocks.

It will be understood that the invention may be practiced with any mobile station that operates in a communications network. A mobile station may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile station, pager, Internet/intranet access, Web browser, organizer, calendar and/or a global positioning system (GPS) receiver; and a conventional laptop and/or palmtop receiver or other appliance all of which include a radiotelephone transceiver.

It will be understood that mobile stations according to the invention may operate in any type of wireless communications network. In some embodiments according to the invention, for example, the network may provide services in compliance with what is commonly referred to as the Third Generation Partnership Project (3GPP). 3GPP specifications are based on evolved GSM specifications, now generally known as the Universal Mobile Telecommunications System (UMTS) system, which uses a Wideband Code Division Multiple Access (WCDMA) air interface. The 3GPP is discussed further on, for example, the Internet at: 3gpp.org/, the contents of which are incorporated herein by reference.

It will be understood that, as used herein, the term "quality indication" includes any measure that can be used to indicate the quality of communications between a mobile station and a serving or a neighboring base station (i.e., a base station that is a candidate for a handover of service from the currently serving bases station). In some embodiments according to the invention, the quality indication can include Viterbi metrics, BER estimates and/or correlation values. In yet other embodiments according to the invention, the quality indication can include an RXLEV measurement, an RXLEV CPICH Ec/No measurement, and/or a CPICH RSCP measurement, the measurement requirements of which are defined in 3GPP TS 44.008 for GSM signals or TS 25.133 for WCDMA signals, which is incorporated herein by reference. For CDMA2000 cells, the measurement quantity can be the strength of the pilot signal, which can be determined as defined in TIA/EIA/IS-2000-5-A, which is incorporated herein by reference.

It will be further understood that communications channels discussed herein, such as broadcast channels, are sometimes briefly referred to using a corresponding channel number. As will be understood by those skilled in the art, a BCCH actually refers to a logical channel, whereas the channel number, sometimes commonly called an Absolute Radio Frequency Channel Number (ARFCN), refers to a physical channel. For example, FIGS. 5-6B include a column entitled "BCCH," but actually refers symbolically to the respective ARFCN of the BCCH used by the base station to service that tri-sectored portion of the cell. Accordingly, the channel numbers are used as shorthand for the BCCH that is being measured.

As described herein below in greater detail, in some embodiments according to the invention, a mobile station operating in a communications network can provide a toplist of neighboring base stations by determining base station identifier codes for the neighboring base stations at rates that vary based on quality indications of communications with the neighboring base stations. For example, in some embodiments according to the invention, if the mobile station determines that the RXLEV of a BCCH used by a particular neighboring base station is greater than that of other neighboring base stations, the mobile station can schedule the determination of the base station identifier code carried within the synchronization channel to occur more frequently. Furthermore, neighboring base stations that have lower RXLEVs can be scheduled for determination at lower rates. Accordingly, the mobile station may determine and verify the base station identifier codes for the most likely candidates for handover more frequently thereby increasing the frequency for determining the base station identifier codes for the most likely handover candidates which can reduce the likelihood that the mobile station may fail to report an up-to-date BSIC value for a base station to which it is necessary to be handed over before dropping the call.

In contrast, existing mobile stations may determine the base station identifier codes for the neighboring base stations included in the toplist at the same rates regardless of the different RXLEV values associated with each of the neighboring base stations. As appreciated by the present inventors, given that a geographic area is covered by smaller cells in capacity-constrained networks, it may be more likely that an RXLEV measurement is actually being made on a base station other than that expected by the network. The network may determine this when the measurement report is received from the mobile station with one or more of the BSIC values that do not correspond to those values expected by the network. These BSICs may be from more remote base stations (using the same frequency as a nearer base station) that are, because of topology, now "visible" to the mobile. The signal level of the remote base station with the unexpected BSIC value may appear to be a valid hand over candidate to the terminal but would be rejected by the network. Therefore, as appreciated by the present inventors, it is desirable to have the mobile station verify the BSIC of more potential hand over candidates more often to increase the possibility of a successful handover.

In other embodiments according to the invention, other quality indications can be used. For example, in some embodiments according to the invention, the bit error rate of the broadcast control channel can be used as the quality indication of communications with the neighboring base station. In still other embodiments according to the invention, rates of change of the quality indication (such as the rate of change of RXLEV or the rate of change of the BER) can be used as the basis for increasing/decreasing the rate at which the base station identifier codes are determined.

In still other embodiments according to the invention, different quality indications can be used in combination with one another. For example, in some embodiments according to the invention, the RXLEV values and the BERs may be used to determine the rates at which the base station identifier codes are decoded. In other embodiments according to the invention, the RXLEV values for the neighboring base stations can be compared to the RXLEV value for the serving base station which currently serves the mobile station. Accordingly, in some embodiments according to the invention, the rates for determination of the base station identifier codes associated with neighboring base stations having RXLEV values greater than that of the serving base station can be increased and the remaining neighboring base stations (having RXLEV values less than that of the serving base station) can be determined at reduced rates.

In still other embodiments according to the invention, the network can specify which quality indication is to be used by the mobile station to determine the rate at which the base station identifier codes for the neighboring base stations are to be determined. For example, in some embodiments according to the invention, the network can indicate to the mobile station that RXLEV should be used or alternatively, that a combination of RXLEV and the BER should be used. In still further embodiments according to the invention, the specification of which quality indication is to be used can be based on the loading placed on the network, maintenance currently occurring on the network, and/or geographic features that are proximate to the base station currently serving the mobile station. Other factors can be used as well.

FIG. 1 is a diagram that illustrates a wireless communications network (network) 10 that supports communications in which mobile stations according to the invention can be used. The network 10 is commonly employed to provide voice and data communications to subscribers using, for example, the standards discussed above. According to FIG. 1, the mobile stations can communicate with each other via a Mobile Switching Center (MSC) 15. The mobile stations can also communicate with other terminals, such as terminals 26, 28, via a Public Service Telephone Network (PSTN) 4 that is coupled to the network 10.

The network 10 is organized into cells that collectively can provide service to a geographic region. In particular, each of the cells can provide service to associated sub-regions included in the geographic region covered by the network 10. More or fewer cells can be included in the network 10, and the coverage area for the cells may overlap.

Each of the cells is provided service by an associated base station, which can provide wireless communications to the mobile stations in the associated geographic region to allow for communications therebetween. Each of the base stations in the network 10 is identified by a code commonly referred to as the base station identifier code (BSIC) which can, in combination with a channel number utilized by the base station BCCH, uniquely identify the base station within an area of the network 10. In other words, each control channel/BSIC combination should be unique enough to identify a cell within the network 10.

Each of the base stations can transmit/receive data to/from the mobile stations over associated broadcast control channels (BCCHs). The control channels can be used to, for example, page a mobile station in response to calls directed thereto or to transmit traffic channel assignments to the mobile station over which a call associated therewith is to be conducted. The control channels can be identified using control channel numbers or identifiers. These channel numbers correlate to unique RF frequencies of operation for the signal. For example, a mobile station can store a channel number that identifies the control channel on which the mobile station is currently camping.

As further shown in FIG. 1, the cells that support the BCCHs in the coverage area are arranged according to a 4/12 frequency re-use pattern where each base station serves three cells that utilize three specific frequencies for their respective control channels (one for each cell). In particular, the frequency re-use pattern is implemented over a plurality of cells where the numbers 1-12 represent the unique frequencies used by the base stations for the broadcast control channels for those cells. Accordingly, each of the cells in the frequency re-use pattern highlighted within the darker lines uses a unique broadcast control channel frequency.

FIG. 1 also illustrates that the highlighted cluster of cells utilizes the complete set of control channel frequencies 1-12, which are re-used to cover a larger area. In particular, a second frequency re-use pattern includes the same twelve frequencies that are assigned as the control channels for the base stations located in the highlighted cluster. It will be understood that although only four replications of the frequency re-use pattern are shown in FIG. 1, a typical communications network 10 will re-use the pattern as much as necessary over a wide area to provide service to the coverage area.

In operation, as a mobile station moves within the area covered by the network 10, one of the base stations currently provides service to the mobile station based on its current location. As the mobile station moves within the area covered by the network 10, the mobile station evaluates neighboring base stations as potential candidates for handover so that when one of the neighboring base stations would actually provide better service to the mobile station based on its changed location, the network can initiate the handover so that one of the neighboring base stations becomes the serving base station.

In order to facilitate the handover operation by the network 10, the mobile station maintains a toplist that includes information related to neighboring base stations which may be likely candidates for the handover. The toplist can include the base station identifier codes (BSICs) for the neighboring base stations, the control channel numbers for the neighboring base stations, and at least one quality indication associated with communications between the mobile station and the neighboring base stations identified by the channel numbers and BSICs. For example, in some embodiments according to the invention, the quality indication can be RXLEV, BER, and/or other types of quality indications.

In some embodiments according to the invention, the toplist can further include an indication of the rate at which the base station identifier code is to be determined. For example, the toplist can specify that a base station identifier code is scheduled to be determined once every second. The rate can also specify that the base station identifier code is scheduled to be determined at lower or higher rates. In operation, as the mobile station moves within the area covered by the network, the mobile station determines the quality indication associated with a neighboring base station identified by the BSIC.

The quality indications associated with the neighboring base stations may fluctuate as the mobile station moves so that the neighboring base station having the highest quality of communications with the mobile station changes. For example, as the mobile station moves from one location to another, the quality of communication with a first neighboring base station may be reduced whereas the quality indication for a second neighboring base station (having previously low quality communications with the mobile station) may improve.

Accordingly, the mobile station can increase the rate at which the BSICs are scheduled to be determined for those neighboring base stations having better quality communications with the mobile and decrease the rate at which the BSICs are scheduled to be determined for those neighboring base stations having relatively low quality of communications. It will be further understood that the mobile station may re-evaluate the quality of communications with the neighboring base stations as the mobile station moves.

Figure 2:
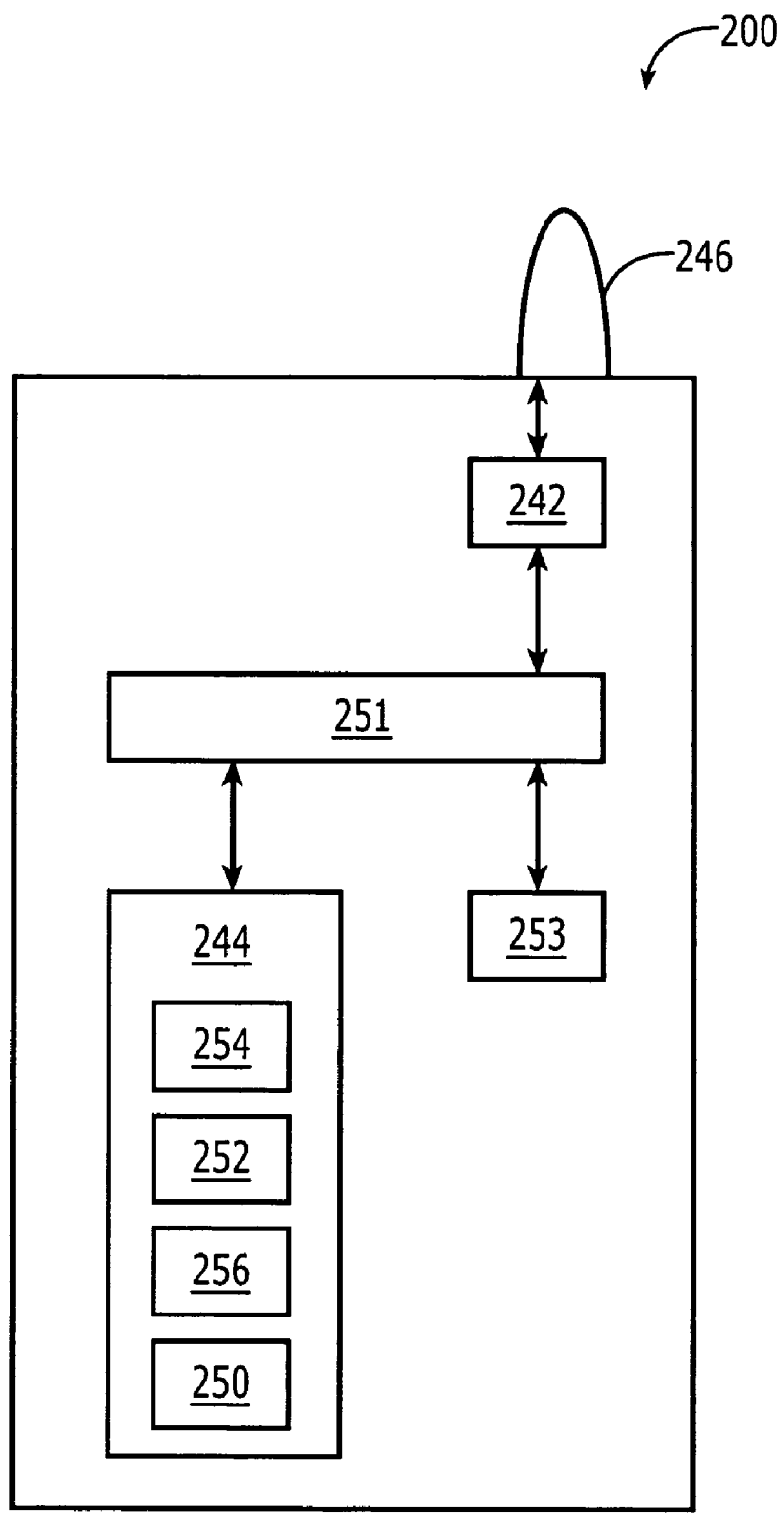
FIG. 2 is a block diagram that illustrates mobile stations in some embodiments according to the invention.

FIG. 2 is a block diagram that illustrates a mobile station 200 in some embodiments according to the invention. As illustrated in FIG. 2, the mobile station 200 includes a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts information, which is to be transmitted by the mobile station 200, into electromagnetic signals suitable for radio communications. A receiver portion of the transceiver 242 demodulates/decodes electromagnetic signals, which are received by the mobile station 200 from the network 10 to provide the information contained in the signals in a format understandable to the user.

A user interface 244 of the mobile station 200 may include a variety of components, such as a display 254, a keypad 252, a speaker 256, and a microphone 250, operations of which are known to those of skill in the art. It will be understood that the functions of the keypad 252 and the display 254 can be provided by a touch screen through which the user can view information, provide input thereto, and otherwise control the mobile station 200.

A processor circuit 251 provides for overall operation of the mobile station 200 including coordination of communications via the transceiver circuit 242, the user interface 244, and other components included in the mobile station 200. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile station 200).

A memory 253 can store computer program instructions that, when executed by the processor circuit 251, carry out the operations described herein and shown in the figures. The memory 253 can be non-volatile memory, such as EEPROM (flash memory), that retains the stored data while power is removed from the memory 253. The memory 253 can also store the information included in the toplist which is maintained and determined as the mobile station moves within the network 10. For example, the memory 253 can store the RXLEV values associated with each of the neighboring base stations as well as the base station identifier codes and control channels associated therewith. The memory 253 can also store the rates at which the base station identifier codes are to be determined. The rates can be used by the processor circuit 251 to schedule the frequency at which, for example, the BSICs are to be determined.

Furthermore, the rates may be used by the processor circuit 251 to schedule demodulation/decoding of the synchronization channel to determine a bit error rate associated with the channel, which may then also be stored as part of the toplist. It will be understood that although the toplist is described as including the information described herein, the toplist may actually be defined by references to data stored in other locations within the memory 253.

It will be understood that the receiver portion of the transceiver circuit 242 can include a demodulator and decoder that can be used (along with the processor circuit 251) to determine the BSIC included in the SCH and the quality indication of the communications with the neighboring base stations. For example, the transceiver and processor circuit 251 can be used to determine the RXLEV value for each of the neighboring base stations. Furthermore, the demodulator/decoder components may be used to determine the bit error rate associated with the synchronization channel that carries the base station identifier code.

Figure 3:
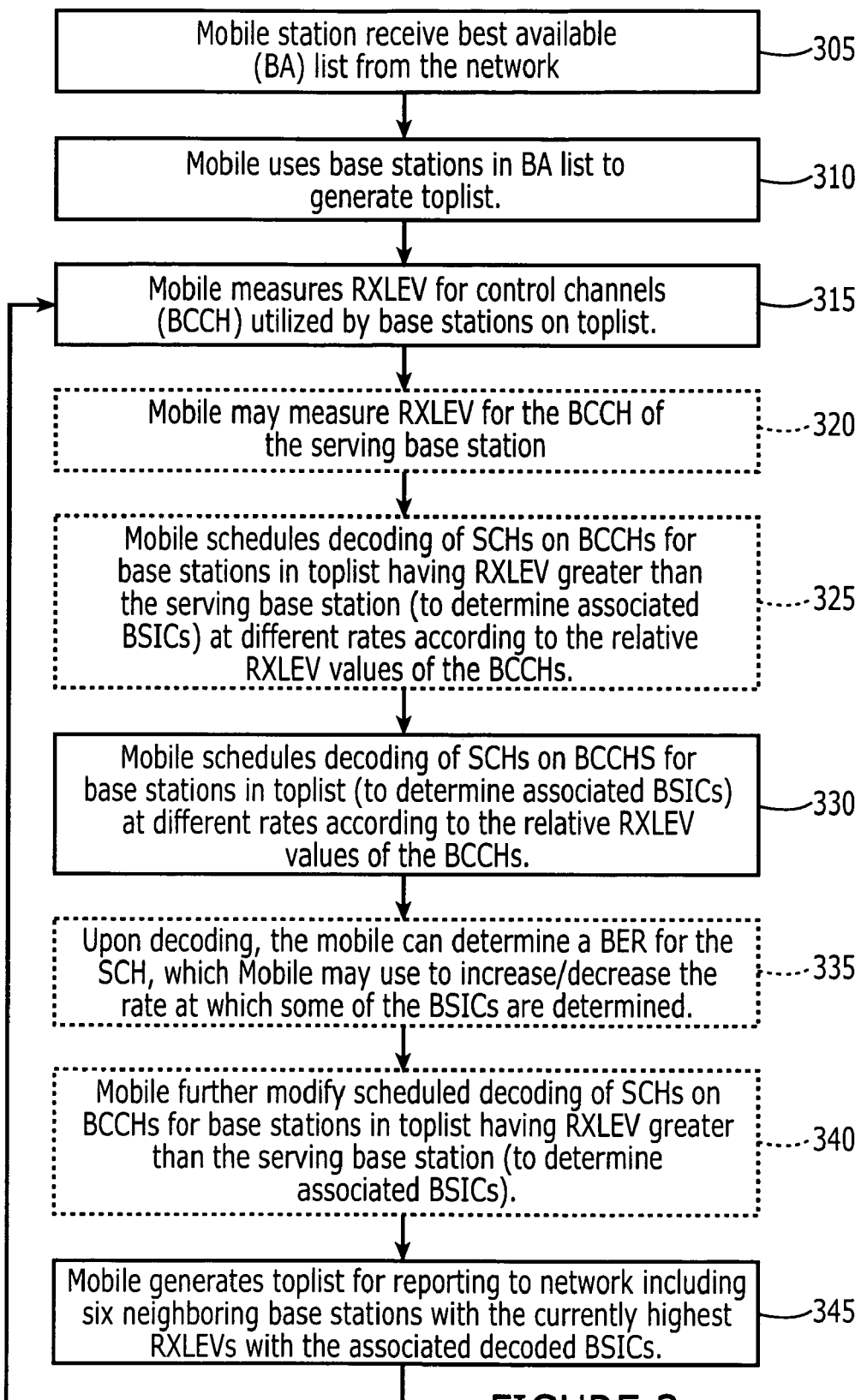
FIG. 3 is a flowchart that illustrates operations of mobile stations and networks in some embodiments according to the invention.

FIG. 3 is a flowchart that illustrates operations of the mobile station 200 within the network 10 in some embodiments according to the invention. As shown in FIG. 3, the mobile station receives a best available (BA) list from the network 10 (block 305). The BA list includes a list of frequency channel numbers corresponding to BCCH of neighboring base stations (based on the mobile station's currently known location.) The mobile station 200 measures RXLEV of these frequency channel numbers, but in some embodiments according to the invention may measure other quality indications of the communications with the neighboring base stations. The mobile station populates the toplist with information related to the neighboring base stations included in the BA list provided by the network 10 (block 310). Subsequently, the toplist can be periodically reported to the network 10 to determine handover candidates. In some embodiments according to the invention, the selection for inclusion in a standard measurement report is based on RXLEV values for the control channels utilized by the neighboring base stations, with the 6 highest values selected according to current 3GPP standards, although a different number may be provided in compliance with other standards.

In some embodiments according to the invention, the mobile station 200 may also measure other quality indications of the communications between the mobile station 200 and the neighboring base stations listed in the toplist. For example, the mobile station may measure the BER value for the control channels utilized by the neighboring base stations included on the toplist (block 315). In some embodiments according to the invention, the mobile station 200 may also measure the RXLEV value for the broadcast control channel utilized by the base station which currently provides service to the mobile station (block 320). Therefore, in some embodiments according to the invention, the determinations of BSICs may be made at varying rates only for those BCCHs with RXLEVs greater than that for the control channel utilized by the serving base station to provide service to the mobile 200 (e.g., a base station used to conduct a call for the mobile 200).

In some embodiments according to the invention, the mobile station 200 schedules the decoding of synchronization channels that are carried by the broadcast control channels of the neighboring base stations in the toplist (to determine the associated BSICs) at different rates according to the relative RXLEV values of the broadcast control channels utilized by the neighboring base stations (block 325).

Alternatively, the mobile station 200 may also schedule the decoding of the synchronization channels carried on the broadcast control channels only for those base stations in the toplist having RXLEV values that are greater than that of the RXLEV for the serving base station (block 330) at a higher rate than those with RXLEV lower than that of the serving base station by a certain amount. Accordingly, the mobile station 200 may focus more closely on determining the BSICs for only those neighboring base stations that have an RXLEV value greater than the serving base station.

Upon determining the base station identifier codes, the mobile station 200 can determine a bit error rate for the synchronization channel, which the mobile may use to increase or decrease the rate at which some of the neighboring base station identifier codes are determined (335). For example, the mobile station may utilize the bit error rate to increase the rate at which a particular base station identifier code is determined despite the fact that a different neighboring base station may have a higher RXLEV value (but having a higher bit error rate). This may arise in congested networks where the signal level is quite high, but a particular channel is suffering a high level of interference. In some embodiments according to the invention, an increased rate of decoding the BSIC for a channel having less interference and a sufficiently high RXLEV channel is more likely to lead to improved handover thereby reducing dropped call.

Once the mobile station 200 updates values in the toplist, the mobile station 200 can report the contents of the toplist including data associated with the six most promising candidate neighboring base stations for a handover (block 345). The reporting of the toplist to the network 10 can be provided as described in 3GPP TS 8.4.1 V5.22.0 (2006-04), entitled "Measurement reporting for the MS," the content of which is incorporated herein by reference.

Figure 4:
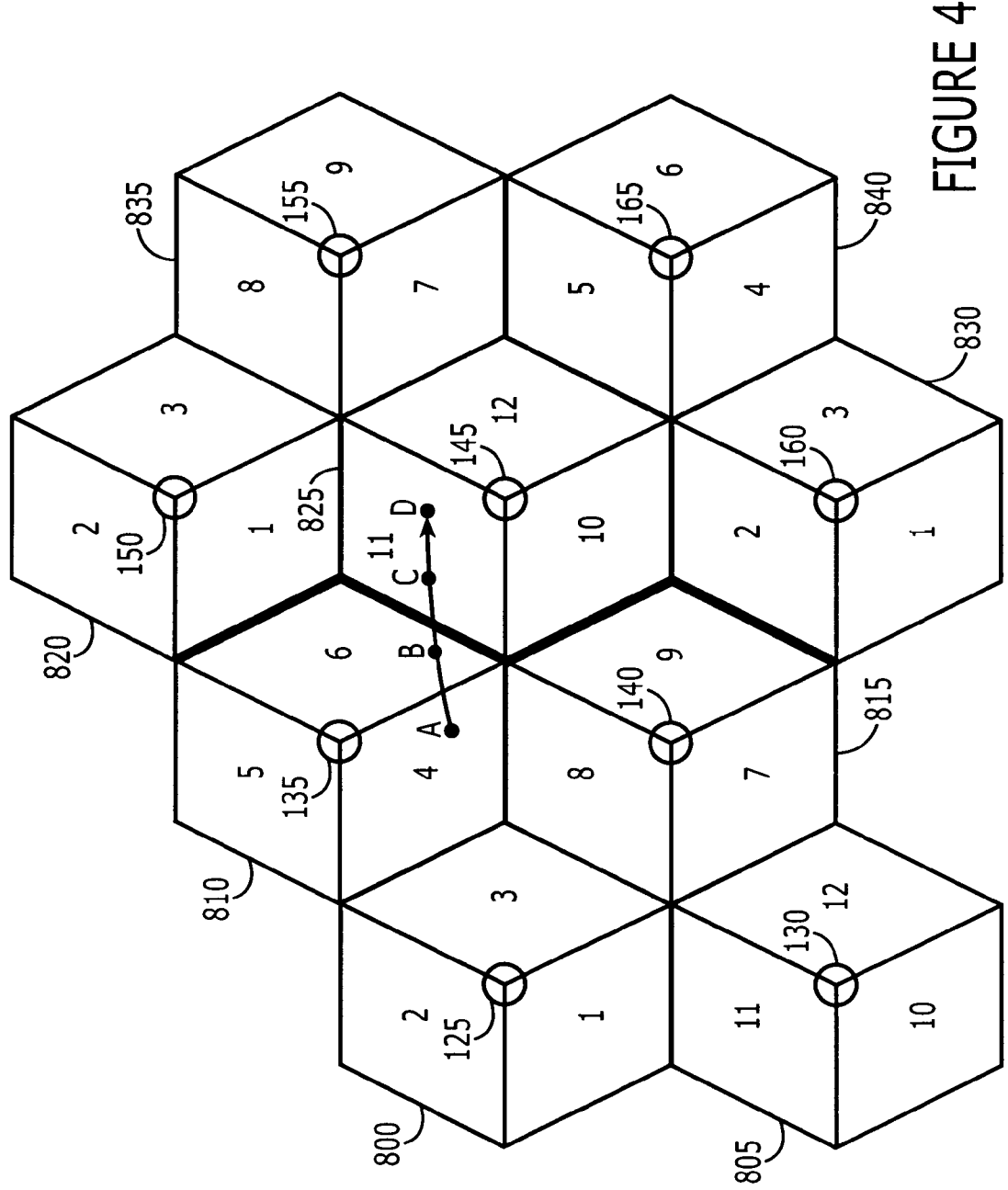
FIG. 4 is a schematic illustration of a mobile station moving within a wireless communications network while maintaining a toplist in some embodiments according to the invention.

FIG. 4 is a schematic illustration of a portion of the communications network 10 shown in FIG. 1 illustrating the exemplary operations shown in FIGS. 5A-5D of mobile stations 200 according to some embodiments of the invention. It will be understood that, the base stations are identified in reference to FIGS. 4-6 by designators 125, 130, 135, 140, 145, 150, 155, 160, and 165 corresponding to BSICs for the respective base stations. In particular, in FIG. 4 the base station serving cell 800 is identified by BSIC 125, the base station serving cell 805 is identified by BSIC 130, the base station serving cell 810 is identified by BSIC 135, the base station serving cell 815 is identified by BSIC 140, the base station serving cell 820 is identified by BSIC 150, the base station serving cell 825 is identified by BSIC 145, the base station serving cell 830 is identified by BSIC 160, the base station serving cell 835 is identified by BSIC 155, and the base station serving cell 840 is identified by BSIC 165.

According to FIG. 4, the mobile station 200 is initially located at position A within the cell 810 serviced by base station 135. Over time, the mobile station 200 moves to locations B, C and D, during which time the mobile station 200 maintains the toplist according to some embodiments of the present invention. In referring to FIG. 4, it is assumed that the mobile station has previously been provided with a BA list by the network 10 whereupon the mobile station 200 has maintained a toplist based thereon.

FIGS. 5A-5D are schematic representations of toplists maintained by the mobile station 200 undergoing the movements shown in FIG. 4. Therefore, FIGS. 4 and 5A-5D illustrate maintenance of the toplist by the mobile station 200 as the mobile terminal 200 moves from position A to position D. The toplist illustrated by FIGS. 5A-5D includes: unique base station identifier codes (BSICs) that identify the neighboring base stations relative to the mobile station 200, the frequencies of the broadcast control channels utilized by the base stations, the RXLEV values for the BCCHs last determined by the mobile station 200, and the rate (in seconds) at which the BSICs are scheduled to be determined based on the associated RXLEV values. It will be understood that FIGS. 5A-5D illustrate exemplary embodiments according to the invention, and is not to be construed to limit the present invention to embodiments that evaluate RXLEV values as the sole quality indication, but rather other embodiments can utilize any indication of quality of communications between the mobile station and the respective neighboring base station.

Referring to FIGS. 5A-5D, in initial position A the mobile station 200 determines that BCCH 8 utilized by the neighboring base station identified by BSIC 140 has an associated RXLEV value of −80 dB. The mobile station 200 also determines that the BCCHs of the remaining neighboring base stations shown in the toplist of FIG. 5A have the corresponding RXLEV values, all of which are less than the RXLEV value of BCCH 8 associated with the neighboring base station identified by the BSIC 140. Accordingly, the BSICs associated with the higher quality BCCHs in the toplist of FIG. 5A are determined at a rate that exceeds that of the BCCHs for other base stations having lower RXLEVs.

It will be understood that the RXLEV values for the BCCHs can be directly influenced by the distance that separates the mobile from base stations that utilize the BCCHs. For example, in position A the mobile is relatively close to the base station identified by the BSIC 140 and is relatively remote from the base station identified by the BSIC 165. Accordingly, the closer BCCHs can have relatively high RXLEVs while the remote BCCHs can have relatively low RXLEVs. As the mobile moves, the RXLEVs measured by the mobile may fluctuate.

However, as the mobile moves closer to some relatively remote base stations, the BCCHs used by those remote base stations become more "visible" to the mobile. Moreover, if those remote base stations utilize the same (i.e., common) BCCHs as closer base stations, the RXLEV measured by the mobile for the common BCCHs may become relatively high. For example, as the mobile moves away from a base station utilizing BCCH 7 toward another remote base station that utilizes BCCH 7, the RXLEV for BCCH 7 may initially fade, but then increase as the mobile approaches the remote base station. In such situations, the mobile can increase the rate at which the BSIC carried over BCCH 7 is determined.

Referring to FIG. 5B, when the mobile station 200 moves to location B, the mobile station measures the RXLEV for BCCH 8 as reduced to −95 dB, whereas the RXLEV value for the BCCH 11 (utilized by the base station identified by BSIC 145) has increased to −80 dB. Therefore, the mobile station 200 increases the rate for determining the BSIC carried over BCCH 11 to once a second, and further, reduces the rate for determining the BSIC received over BCCH 8 to three seconds.

As further shown in FIG. 5B, the RXLEV for channel 1 has increased, thereby leading to an increase of the rate at which the corresponding BSIC is determined to once every two seconds. Furthermore, the mobile actually measures an increase in the RXLEV for BCCH 7 to −98 dB due to the combined signals from the base stations identified BSICs 140 and 155, whereas the RXLEVs (and consequently the rates) for the remaining BCCHs remain unchanged when the mobile moves from location A to B.

According to FIG. 5C, the mobile station 200 moves to location C and measures the RXLEV for BCCH 8 to be further reduced to −102 dB, thereby leading to a reduction in the rate at which the BSIC carried on BCCH 8 is determined to once every 16 seconds. As further shown in FIG. 5C, the RXLEV value for BCCH 11 increases as the mobile is moving closer to the base station identified by the BSIC 145 utilizing BCCH 11, which leads to an increase in the rate of determining the associated BSIC carried thereon to once a second.

As further shown in FIG. 5C, the RXLEV for BCCH 7 increases as the mobile is moving closer to the remote base station identified by the BSIC 155 utilizing BCCH 7 due to the combination with BCCH 7 utilized by the base station identified by the BSIC 140, thereby leading to an increase in the rate of determining the associated BSIC carried thereon to every 3 seconds.

Still referring to FIG. 5C, the RXLEV for BCCH 2 increases to −90 dB as the BCCH 2 utilized by the base station identified by BSIC 150 is more visible to the mobile, which leads to an increase in the rate at which the BSIC carried on BCCH 2 is determined to every two seconds. It will be understood that it is this increase in the RXLEV for BCCH 2, which causes the mobile to more frequently determine the BSIC carried on BCCH 2, which as shown by FIGS. 5A-5C, leads to the change from the BSIC 125 to BSIC 150. As further shown in FIG. 5C, the RXLEV for BCCH 5 is further reduced as the mobile moves away from the base station identified by BSIC 135 (but is still too remote from the base station identified by BSIC 165 to receive a significant signal therefrom) leading to a reduction in the rate at which the BSIC is determined to every 10 seconds.

According to FIG. 5D, the mobile station 200 moves to location D whereupon the RXLEV for BCCH 11 increases to −80 dB due to the close proximity to the base station identified by BSIC 145, leading to an increase in the frequency at which the BSIC carried over control channel 11 is determined to once a second. The RXLEV for BCCH 1 remains unchanged so that the rate at which the BSIC carried over BCCH 1 remains constant. As further shown, the RXLEV for BCCH 7 increases as the mobile moves toward the base station identified by BSIC 155, thereby causing an increase in the rate at which the BSIC is determined to once every two seconds.

As the mobile moves toward the base station identified by BSIC 155, the RXLEV for BCCH 8 also increases so that the BSIC thereof is determined more frequently (once every two seconds), leading to the change in the BSIC (from 140 to 155) for BCCH 8 in FIG. 5D. The RXLEV for BCCH 2 decreases, leading to a reduction in the rate at which the BSIC carried thereon is determined (to once every 3 seconds), whereas the RXLEV for BCCH 5 remains unchanged so that the rate for determination of the BSIC is also unchanged.

FIGS. 6A-6B illustrate toplists maintained by the mobile station when utilizing a secondary quality indication to determine the rates at which base station identifier codes are determined in some embodiments according to the invention. According to FIG. 6A, when the mobile station is at position A, the RXLEVs may be measured to be the same as described above in reference to FIG. 5A. However, the toplist shown in FIG. 6A also includes a bit error rate (BER) for each of the control channels that carries the base station identifier code.

Each of the control channels has a bit error rate equal to two so that the mobile station 200 does not distinguish between the control channels based on the bit error rate alone. Accordingly, the mobile station 200 may determine the base station identifier code carried over control channel 8 at the highest rate based on the associated RXLEV being the greatest among the neighboring base stations.

When the mobile station 200 moves to location B, the mobile station can update the RXLEV values and the bit error rates for the respective control channels as shown in FIG. 6B. In particular, the mobile station 200 may determine that the RXLEVs remain unchanged relative to those shown in FIG. 6A. However, the mobile station 200 may also determine the BER for control channel 11 is actually lower than the BER associated with control channel 8. Accordingly, the mobile station 200 may increase the rate at which the BSIC carried over BCCH 11 is determined even though the RXLEV for BCCH 8 is greater than that of BCCH 11.

The mobile station 200 may utilize the secondary quality indication of BER in conjunction with the RXLEV to determine the rate at which the base station identifier codes are determined. In other embodiments according to the invention, the BERs may only be used as a basis for determining the rate if the neighboring base station has an RXLEV that is greater than that of the control channel that is currently serving the mobile station.

In still other embodiments according to the invention, the determination of BSIC carried on the BCCH can be based on the BER so that a relatively high BER can lead to an increase in the rate. For example, when the mobile moves from location A to B, the BER for BCCH 8 may increase due to interference between BCCH 8 utilized by the base station identified by BSIC 155 and BCCH 8 utilized by the base station identified by BSIC 140. Accordingly, the rate for determining the BSIC carried on BCCH 8 can be increased responsive to the increase in the BER, that can indicate interference on the BCCH which may be caused due to the increased visibility of the relatively remote base station utilizing the same BCCH as the relatively close base station.

As described above, in some embodiments according to the invention, a mobile station operating in a communications network can provide a toplist of neighboring base stations by scheduling for determination base station identifier codes for the neighboring base stations at rates that vary based on quality indications of communications with the neighboring base stations. For example, in some embodiments according to the invention, if the mobile station determines that the RXLEV for a particular neighboring base station is greater than that of other neighboring base stations, the mobile station can schedule the decoding of the base station identifier code carried within the synchronization channel to occur more frequently. Furthermore, neighboring base stations that have lower RXLEVs can be scheduled for decoding at lower rates. Accordingly, the mobile station may verify the base station identifier codes for the most likely candidates for handover more frequently thereby increasing the frequency for determining the base station identifier codes for the most likely handover candidates, which can reduce the likelihood that the mobile station may misreport an RXLEV value for a base station.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method of providing a toplist of neighboring base stations for a mobile station in a communications network, the method comprising:

determining, by measuring a received signal level (RXLEV) for a broadcast control channel (BCCH) utilized by a neighboring base station, a base station identifier code for the neighboring base station in a toplist at a rate that varies based on a quality indication of communications with the neighboring base station; and increasing the rate at which the base station identifier code is determined responsive to an increase in a rate of change of RXLEV or decreasing the rate at which the base station identifier code is determined responsive to a decrease in the rate of change of RXLEV, wherein the rate corresponds to how frequently the base station identifier code is determined.

2. A method according to claim 1 further comprising:
increasing the rate at which the base station identifier code is determined responsive to an increase in RXLEV or decreasing the rate at which the base station identifier code is determined responsive to a decrease in RXLEV.

3. A method according to claim 1 wherein the neighboring base station comprises a first neighboring base station and the base station identifier code comprises a first base station identifier code that identifies the first neighboring base station, wherein determining further comprises:

determining the first base station identifier code at a first rate based on a first quality indication of communications with the first neighboring base station; and determining a second base station identifier code that identifies a second neighboring base station at a second rate based on a second quality indication of communications with the second neighboring base station.

4. A method according to claim 1 further comprising:
increasing rates for determining base station identifier codes of first neighboring base stations having associated RXLEVs that are greater than RXLEV for a serving base station that is currently serving the mobile station or decreasing the rates for determining base station identifier codes of second neighboring base stations having associated RXLEVs that are less than RXLEV for the serving base station.

5. A method according to claim 4 further comprising:
determining bit-error-rates (BERs) for signals carried on synchronization channels utilized by first neighboring base stations; and
increasing rates for ones of the first neighboring base stations having relatively low BERs.

6. A method according to claim 1 wherein determining comprises:
decoding a signal carried on a synchronization channel utilized by the base station to provide the base station identifier code.

7. A method according to claim 6 wherein the signal is decoded during an idle slot in a traffic channel from a serving base station.

8. A method according to claim 6 further comprising:
determining a bit-error-rate (BER) for the signal; and
increasing the rate at which the signal is decoded responsive to a decrease in the BER or decreasing the rate at which the signal is decoded responsive to an increase in the BER.

9. A method according to claim 6 further comprising:
determining a bit-error-rate (BER) for the signal; and
increasing the rate at which the signal is decoded responsive to an increase in a rate of change of the BER or decreasing the rate at which the signal is decoded responsive to a decrease in the rate of change of the BER.

10. A method according to claim 1 further comprising:
receiving, from the network, a specification of the quality indication to be used by the mobile station.

11. A method according to claim 10 wherein the specification of the quality indication to be used is based on loading of the network, maintenance of the network, and/or geographic features proximate to the base station currently serving the mobile station.

12. A method according to claim 1 wherein the communications network provides 3rd Generation Partnership Project compliant service to the mobile station.

13. A GSM mobile station configured to operate according to claim 1.

14. A method of providing a toplist of neighboring base stations for a mobile station in a Global System for Mobile (GSM) communications network, the method comprising:

measuring broadcast control channels (BCCHs) utilized by neighboring base stations to provide a plurality of respective RXLEVs for inclusion in a toplist;

decoding a first signal carried on a first synchronization channel included in a first BCCH having a first rate of change of a first RXLEV at a first decoding rate to provide a first base station identifier code;

decoding a second signal carried on a second synchronization channel included in a second BCCH having a second rate of change of a second RXLEV that is less than the first rate of change of the first RXLEV at a second decoding rate that is less than the first decoding rate to provide a second base station identifier code; and providing the toplist including the first and second base station identifier codes and the first and second RXLEVs to the network, wherein the second decoding rate that is less than the first decoding rate corresponds to the first base identifier code being decoded more frequently than the second base station identifier code.

15. A method according to claim 14 further comprising:
changing the first and second decoding rates at which the first and second signals are decoded responsive to increase/decrease in the first or second RXLEV.

16. A method according to claim 14 further comprising:
comparing the first and second RXLEVs to RXLEV for a serving BCCH utilized by a serving base station currently providing service to the mobile station;
increasing the first or second decoding rate if the first or second RXLEV is greater than the RXLEV for the serving BCCH; and
decreasing the first or second decoding rate if the first or second RXLEV is less than the RXLEV for the serving BCCH.

17. A method according to claim 16 further comprising:
determining bit-error-rates (BERs) for the first or second signals carried on synchronization channels included in the BCCHs having RXLEVs that are greater than the RXLEV for the serving BCCH; and
increasing decoding rates for ones of the first or second signals having relatively low BERs.

* * * * *